May 20, 1952 — A. J. HORNFECK — 2,597,730
DUAL BRIDGE MOTOR CONTROL CIRCUIT
Original Filed March 31, 1945 — 2 SHEETS—SHEET 1

INVENTOR.
ANTHONY J. HORNFECK
BY Woodling and Krost,
Attys.

INVENTOR.
ANTHONY J. HORNFECK

Patented May 20, 1952

2,597,730

UNITED STATES PATENT OFFICE 2,597,730

DUAL BRIDGE MOTOR CONTROL CIRCUIT

Anthony J. Hornfeck, Lyndhurst, Ohio, assignor to Bailey Meter Company, a corporation of Delaware Original application March 31, 1945, Serial No. 585,891. Divided and this application February 24, 1950, Serial No. 145,991

15 Claims. (Cl. 318—51)

This invention relates to measuring and controlling systems and apparatus, and more particularly to electrical circuits for motors and other controlling means used in connection with contour control or duplicators for machine tools such as lathes, shapers, planers, milling machines, die sinking machines, and the like. It is, of course, to be understood that my invention is not limited to use with contour control for machine tools, but finds ready application in many other embodiments.

This invention is a division of Serial No. 585,891, filed March 31, 1945 now matured into Patent No. 2,557,824, issued June 19, 1951.

An object of the invention is to provide an electrical network which is capable of shifting the phase of the output voltage of the network rapidly relative to the unbalancing condition and yet maintaining the output voltage substantially constant.

Another object of the invention is to provide an alternating current bridge having opposite reactance arms on a saturable core reactor with a control winding for the reactor which is energizable from an asymmetrical voltage to vary the impedance of the reactance arms.

Another object of the invention is to provide an electrical control system for separate electric motors which are controlled by individual alternating current phase shifting bridges which are in turn controlled by a single varying electrical condition.

Another object of the invention is to provide an electrical control system for two two-phase alternating current induction motors wherein each motor is controlled by a separate alternating current phase shifting bridge with these bridges normally shifting their output voltage 90 degrees relative to the input and wherein these bridges have a common direct current input control voltage.

A further object of the invention is to provide an electrical circuit for electric motor means which includes two phase sensitive bridge circuits simultaneously controlled by the value of a direct current potential and wherein the load circuit of the bridges includes the electric motor means to thus control the speed and direction of rotation thereof. Further the phase sensitive bridge circuit may include opposite reactance arms on a saturable core reactor with at least one direct current winding for this reactor.

A further object is to provide improved electrical phase shifters for motors and other controlling apparatus sensitive to minute forces or movements.

Other objects and a fuller understanding of the invention may be had by referring to the following description and claims, taken in conjunction with the accompanying drawings, in which:

As one specific embodiment of my invention, I have chosen to illustrate and describe the invention incorporated in a lathe wherein the workpiece, except for rotation about its center, remains stationary and the tool is moved transversely and longitudinally thereof. It will be evident that my invention is applicable to a wide variety of machine tools, and that when I speak of relative movement between the tool and workpiece I include either an arrangement where the tool is stationary and the workpiece is moved, or the workpiece is stationary and the tool is moved, or a combination of the two.

Throughout the specification and claims to follow I indicate that the workpiece is formed to correspond to the profile or shape of a master pattern or template.

Figure 1:
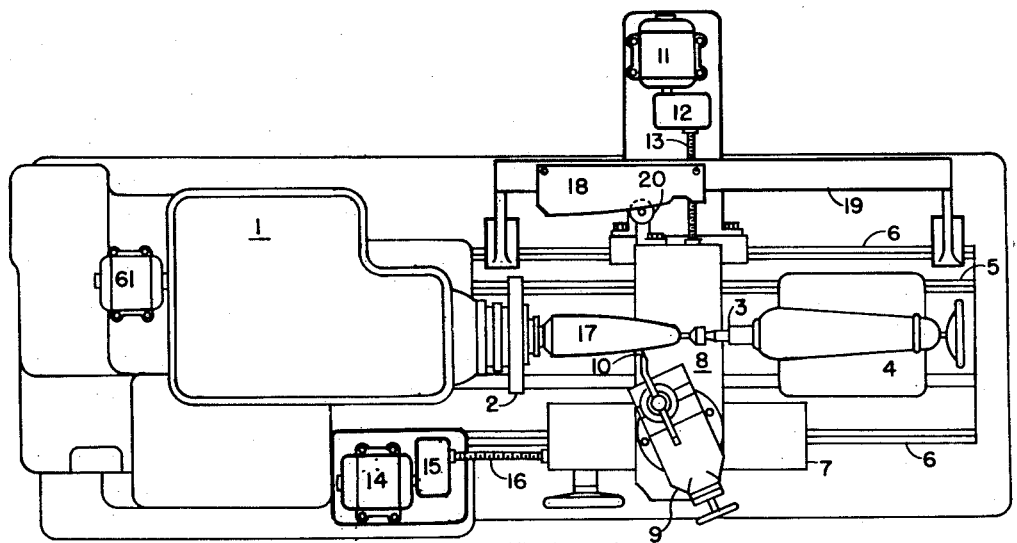
Figure 1 is a plan view of a lathe embodying a contour control system.

Referring to Figure 1, I show my invention applied to an engine lathe 1 having a headstock 2 adapted to be rotated at desired speed by any suitable means 61 and having a tailstock 3. A carriage 4 is movable longitudinally along the bed of the lathe on suitable ways 5 and supports the tailstock 3. Also movable longitudinally along the bed of the lathe on suitable ways 6 is a carriage 7. Mounted on the carriage 7 is a cross slide 8 movable on ways transversely of the bed of the lathe.

The cross slide 8 is provided with an adjustable tool support 9 in which is secured a tool 10. An electric motor 11 drives, through the necessary gear reduction 12, a worm or screw 13 for positioning the cross slide 8 and tool 10 transversely of the bed of the lathe. Longitudinal movements of the tool 10, that is, movements of the tool parallel to the center line of the lathe, are produced by means of a motor 14 operating a lead screw 16 through the intermediary of a gear reduction 15.

Supported by the headstock 2 and tailstock 3 is a workpiece 17, which for illustrative purposes is shown as being formed to a parabolic shape by the tool 10. The particular shape has no significance, it being apparent as the description proceeds that by my invention a workpiece may be formed automatically to any desired contour or shape. A master template or cam 18 is rigidly held in parallelism to the workpiece 17 upon any convenient extension 19 of the lathe bed. The profile of the master 18 is the contour which it is desired to reproduce upon the workpiece 17. In Figure 1 the taper of the workpiece 17 follows in general a parabolic function merely as an example. For contacting and following the profile of the master template 18 I provide a tracer assembly 20 rigidly mounted on and movable with the cross slide 8. The assembly 20 is shown in larger diagrammatic fashion in Figure 2 as having a body member or envelope 21 which is firmly mounted to the cross slide 8 and a tracer arm 22 carried by a flexible diaphragm 23 forming a part of the enclosure 21.

The tracer assembly 20 constitutes an electron discharge device, preferably a two-element tube having a movable anode 24 and a heated cathode 25. The envelope 21, of which the diaphragm 23 forms a part, may be of metal or of glass, but preferably of metal for strength. It is preferably of such shape and construction that the diaphragm 23 will flex to allow movement of the anode 24 within the envelope 21 as a result of positioning the tracer 22 through means external to the envelope, such as engagement of the tracer 22 with the edge of the master template 18.

Such an electron discharge device or tube is preferably a high vacuum tube of the regulating type wherein the effective electron emitting or electron receiving areas of the electrodes are varied without necessarily changing the distance between the electrodes, as shown and described in the patent to McArthur 2,142,857. I have shown the tube in quite diagrammatic fashion as being sufficient for the present disclosure. Movement of the anode 24 relative to the cathode 25 causes a change in magnitude of the electric current which flows through the device, and while the tube is not of the start-stop grid control type, nevertheless movement of the anode away from the cathode in sufficient extent may reduce the current passage to zero.

Figure 2:
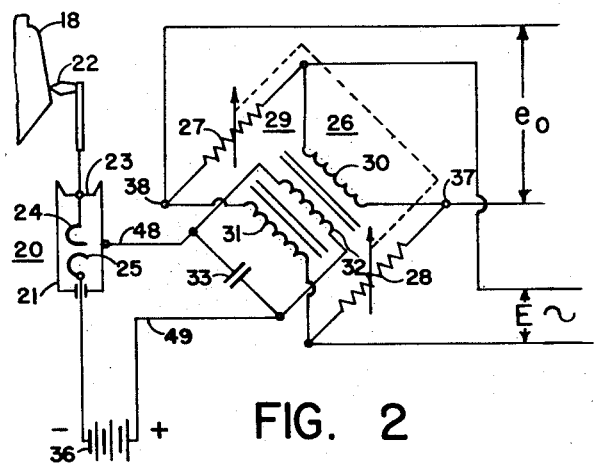
Figure 2 is a partly diagrammatic and partly schematic diagram of a pattern and tracer control for a phase sensitive alternating current bridge.

In Figure 2 I have not only shown the tracer assembly 20 to larger diagrammatic scale, but have shown the complete electrical circuit for controlling the motor 11 by the tracer arm 22 in such manner that the motor 11 will position the cross slide 8 and consequently the tool 10 transversely of the lathe, or in other words toward or away from the workpiece 17 as the tool 10 is moved longitudinally. The action is such that if the contacted edge of the master template 18 is a straight line parallel to the axis of the workpiece 17, then the workpiece 17 would be turned to cylindrical form. If the contacted edge of the master 18 is a straight line, but inclined relative to the axis of the workpiece 17, then the workpiece 17 will be shaped to a taper. The particular showing of Figure 1 is in general a parabolic on curve on the contacted edge of the master 18, and thus the form to be produced on the workpiece 17.

Figure 3:
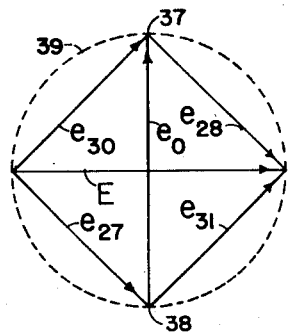
Figure 3 is a vector diagram of the voltage vectors obtainable across the phase shift bridge 26 of Figure 2.
Figure 4:
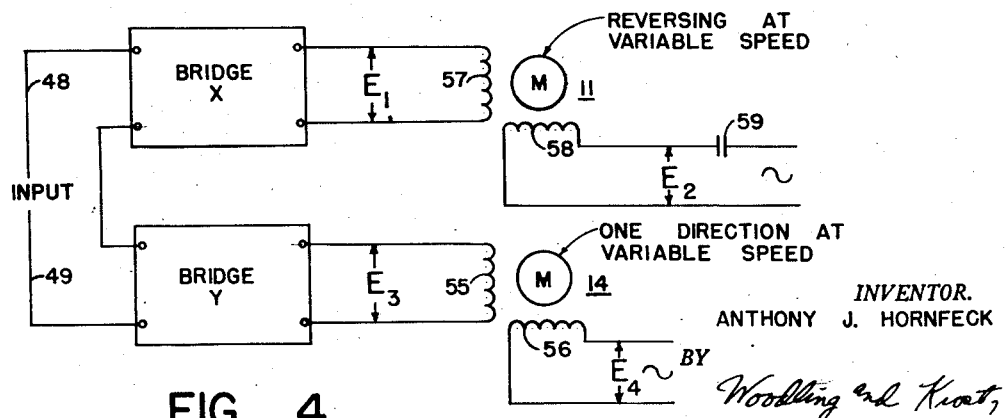
Figure 4 is an electric circuit diagram of simultaneous control of the two motors of Figure 1.

Referring now in particular to Figures 2, 3 and 4, I will describe the electrical control circuit whereby the direction and speed of rotation of the motor 11 and speed of the motor 14 is controlled by the interaction of tracer arm 22 with the template 18. In general the arrangement of Figure 2 provides a phase sensitive bridge or network 26 controlling the motor 11.

The phase sensitive bridge 26 is an alternating current bridge having a source of alternating current supply whose voltage is designated as E. The bridge comprises opposite resistance legs 27, 28 simultaneously hand adjusted as illustrated. The remaining two legs 30 and 31 of the bridge are reactive legs whose impedance is equal to each other and to the resistance of the legs 27, 28. With such a bridge the output voltage $e_0$ is 90 degrees out of phase with the bridge alternating current supply E.

The two reactive legs 30, 31 form alternating current windings of a saturable core reactor 29 having a direct current saturating winding 32, shunted by a capacitor 33, and joining a direct current power source 36 through the electron device 20. Thus positioning of the anode 24 relative to the cathode 25 (of the device 20), through the interaction of tracer 22 with template 18, varies the direct current applied to the saturating winding 32 across leads 48 and 49, and thus varies the reactance or impedance to alternating current flow through the bridge legs 30, 31.

The network is normally biased so that some direct current is flowing through the windings 32, but not enough to result in motor rotation. Such a "neutral" condition exists when the tracer arm 22 is slightly biased in a clockwise direction (Figure 2) by pressure against the template 18. From such position a rise or recession of the shape of the template encountered will cause a deflection of arm 22 further clockwise or in a counter-clockwise direction, respectively. This will result in a variation in the amount of direct current flowing through the saturating winding 32, and will result in shifting of the phase of the bridge output voltage $e_0$ in one direction or the other relative to the phase of the bridge supply voltage E, and in degree dependent upon the amount of direct current flow (relative to the neutral value) through the saturating winding 32 and correspondingly upon the direction and amount of deflection of the arm 22.

The Figure 3 is a vector diagram showing the vectors obtainable from the phase shift bridge 26. The alternating current input voltage E has been shown as horizontal on this Figure 3 with the voltage vectors of the four arms of the bridge being designated as $e_{27}$, $e_{28}$, $e_{30}$ and $e_{31}$, respectively. The output voltage vector $e_0$ has been shown as vertical on this vector diagram and as joining the output terminals 37 and 38. It will be seen that this output voltage $e_0$ is 90 degrees out of phase with the input voltage E, and it will be further seen that variations in the impedance of the arms 30 and 31 will shift the potentials of the points 37 and 38 about a substantially circular locus 39 in such a manner that the output voltage $e_0$ remains substantially constant and yet may shift in phase nearly 180 degrees relative to the input voltage E.

In Figure 4 I do show schematically the control of the motor 11 reversible at variable speed and the motor 14 operating in one direction at variable speed, both simultaneously from the direct current input through conductors 48, 49. The motors 11 and 14 are alternating current type motors, and a particular feature of my invention is that the control of speed is entirely by phase shift or amount of lead or lag in phase relative to the line, and wherein the voltage tends to remain constant. Thus the motor speed control in accordance with my invention is by phase shift rather than by magnitude of voltage or current. The alternating current voltages $E_1$ and $E_3$ have voltage values remaining substantially proportional to line voltage. The phase, however, of $E_1$ and of $E_3$ is shifted by the bridges X and Y, respectively, simultaneously and in the same direction and amount. The bridges X and Y may be such as the phase sensitive bridge 26 of Figure 2.

Figure 5:
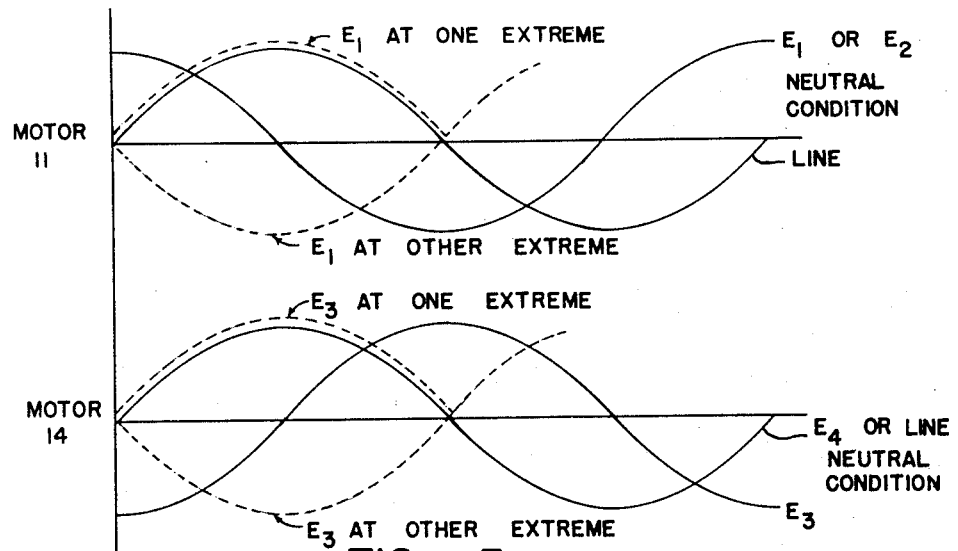
Figure 5 is a graph of conditions in Figure 4.

Referring to Figure 5, wherein I plot phase conditions of the voltages in connection with motors 11 and 14, it will be noted that the solid curves represent phase conditions under "neutral" condition of direct current input through the conductors 48, 49, whereas the dotted lines show voltage phase conditions at the extreme of phase shift either way from the neutral. It is a characteristic of the circuit that the phase shift will not be over 90 degrees either way from neutral. It will be observed that the motor 11 has a winding 57 connected across $E_1$ and at 90 electrical degrees thereto a winding 58 connected in series with a capacitor 59 and across $E_2$. The motor 14 has similar windings 55 and 56 90 electrical degrees apart, but does not have the capacitor 59.

Referring to the uppermost graph of Figure 5 which is representative of conditions appurtenant to motor 11, it will be observed that under the neutral condition of direct current input to the conductors 48, 49, $E_1$ and $E_2$ are in phase with each other for zero motor speed and are 90 degrees out of phase with the line voltage due to the effect of capacitor 59 on voltage $E_2$. Voltage $E_1$ can be shifted by bridge X to be in phase with the line or 180 degrees out of phase with the line, i. e., it leads or lags $E_2$ by 90 degrees as an extreme. Intermediate phase relation between $E_1$ and $E_2$ determines not only the direction but also the speed of rotation of the motor 11.

Under neutral conditions $E_4$ is in phase with the line and $E_3$ is 90 degrees out of phase with both the line and $E_4$. This means that under neutral condition the motor 14 is rotating at its maximum speed. Shifting of the phase of $E_3$ 90 degrees either way from the neutral condition means that for one direction of phase shift $E_3$ will approach in-phase relation to $E_4$ and the motor armature will approach zero speed. Under the other extreme of phase shift $E_3$ will approach 180 degrees out-of-phase with $E_4$ and the motor armature will approach zero speed of rotation. Thus from a neutral condition wherein motor 14 is rotating at maximum speed the speed will be decreased upon any shift in phase of $E_3$ in either direction relative to $E_4$, and the speed variation between maximum and zero will depend upon the degree of phase shift.

Figure 6:
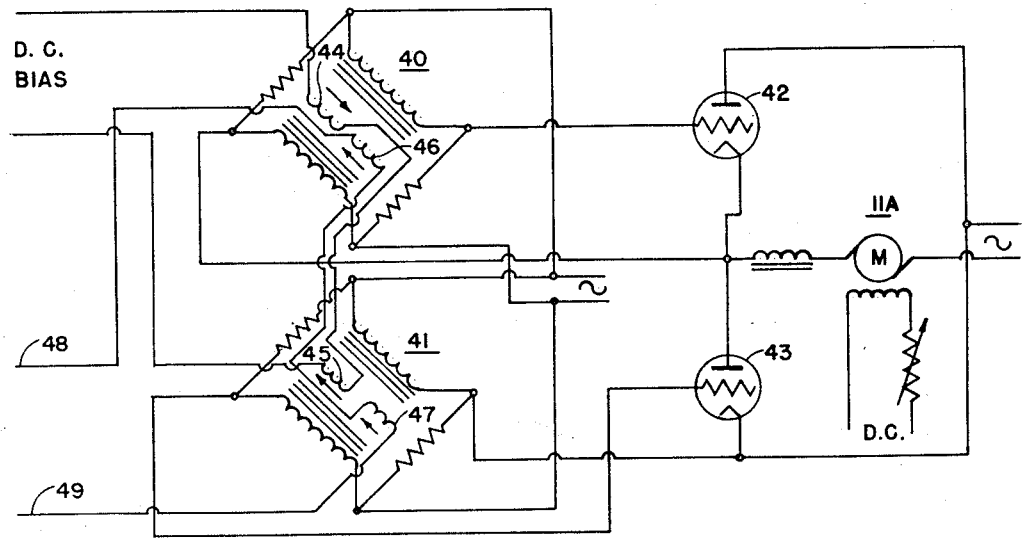
Figure 6 is a modification of my motor control circuit.

In Figure 6 I show a circuit for the control of a motor 11a from a direct current input over conductors 48, 49 and employing two phase sensitive bridges 40, 41 for control of the electron devices 42 and 43, which may be of the gaseous type if desired to control large direct current motors.

The bridges 40 and 41 are similar to each other and in general are similar to the bridge 26 of Figure 2. Each bridge has a saturable core reactor, but in bridges 40 and 41 there is a direct current bias applied to a winding 44 and 45 of each reactor in addition to the direct current control winding 46 and 47. In bridge 40 the bias is opposing the control winding whereas in bridge 41 it is additive. Inasmuch as the bias is equal in the two bridges, the current across conductors 48, 49 is zero at a balanced condition with the motor 11a not rotating. Under this condition the reactors are equally saturated by the common bias current. Unbalance of the supply to 48, 49 in one direction produces increased saturation of bridge 40 and decreased saturation of bridge 41. This produces a grid voltage on tube 42 more nearly in phase with its plate and less in phase on the plate of tube 43. Reversal of the direct current supply to 48, 49 produces an opposite effect.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electrical circuit, comprising, in combination, direct current control winding means, an electron discharge device having a relatively movable anode and cathode connected to said winding means to vary the value of a direct current potential applied to said control winding means, first and second alternating current bridges, said bridges each including opposite reactance arms, saturable core reactor means for said reactance arms and including said control winding means, electric motor means connected to the output of said bridges, the bridges being controlled by said direct current to control said electric motor means in speed and direction of rotation.

2. An electrical circuit, comprising, in combination, an electron discharge device having a cathode and an anode, terminals for connection to an asymmetrical current source, asymmetrical current control winding means, circuit means for connecting in series said cathode, said anode, said terminals and said control winding means, means to vary the value of the asymmetrical current in said series circuit, first and second alternating current bridges, said bridges each including opposite reactance arms, saturable core reactor means for said reactance arms and including said control winding means, and electric motor means connected to the output of said bridges, the bridges being controlled by said asymmetric current to control said electric motor means.

3. An electrical circuit, comprising, in combination, an electron discharge device having a cathode and an anode, terminals for connection to a direct current source, direct current control winding means, circuit means for connecting in series said cathode, said anode, said terminals and said control winding means, means to vary the value of the direct current in said series circuit, first and second alternating current bridges, said bridges each including opposite impedance arms and opposite reactance arms, saturable core reactor means for said reactance arms and including said control winding means, and load circuit means including electric motor means connected to the output of said bridges being controlled by said direct current, with the magnitude of the output voltage remaining substantially constant while shiftable in phase relative to the input to control said electric motor means in speed and direction of rotation.

4. An electrical circuit, comprising, in combination, an electron discharge device having a cathode and a movable anode to establish a variable transconductance in said device, terminals for connection to an asymmetrical current source, asymmetrical current control winding means, circuit means for connecting in series said cathode, said anode, said terminals and said control winding means, first and second alternating current phase sensitive bridges, said bridges each including opposite reactance arms, saturable core reactor means for said reactance arms and including said control winding means, and load circuit means including electric motor means connected to the output of said bridges, the bridges being controlled by said asymmetrical current to control said electric motor means in speed and direction of rotation.

5. An electrical circuit, comprising, in combination, an electron discharge device having a cathode and a movable anode to establish a variable transconductance in said device, terminals for connection to an asymmetrical current source, asymmetrical current control winding means, circuit means for connecting in series said cathode, said anode, said terminals and said control winding means, first and second alternating current phase sensitive bridges, said bridges each including opposite resistance arms and opposite reactance arms, saturable core reactor means for said reactance arms and including said control winding means, and load circuit means including electric motor means connected to the output of said bridges, the bridges being controlled by said asymmetrical current, with the magnitude of the output voltage remaining substantially constant while shiftable in phase relative to the input to control said electric motor means in speed and direction of rotation.

6. An electrical circuit, comprising, in combination, an electron discharge device having a cathode and a movable anode, terminals for connection to an asymmetrical current source, first and second asymmetrical current control windings, circuit means for connecting in series said cathode, said anode, said terminals and said control windings, said anode being movable to vary the value of the asymmetrical current in said control windings, first and second alternating current phase sensitive bridge circuits, said bridges each including opposite impedance arms and opposite reactance arms and a saturable core reactor for said reactance arms, the saturable cores of said first and second bridges including said first and second control windings, respectively, load circuit means including electric motor means connected to the output of said bridges, the bridges being simultaneously controlled by said asymmetrical current, with the magnitude of the output voltage remaining substantially constant while shiftable in phase relative to the input to control said electric motor means in speed and direction of rotation.

7. An electrical circuit, comprising, in combination, an electron discharge device having a cathode and a movable anode, terminals for connection to a direct current source, first and second direct current control windings, circuit means for connecting in series said cathode, said anode, said terminals and said control windings, said anode being movable to vary the value of the direct current in said control windings, first and second alternating current phase sensitive bridge circuits, said bridges each including opposite resistance arms and opposite reactance arms and a saturable core reactor for said reactance arms, the saturable cores of said first and second bridges including said first and second control windings, respectively, and load circuit means including electric motor means connected to the output of said bridges, the bridges being simultaneously controlled by said direct current, with the magnitude of the output voltage remaining substantially constant while shiftable in phase relative to the input to control said electric motor means in speed and direction of rotation.

8. An electrical circuit, comprising, in combination, means to vary the value of an assymmetrical current potential, a first and a second electric motor, an alternating current phase sensitive bridge circuit for each of the motors, the bridges including saturable core reactor means having the impedance thereof simultaneously controlled by the asymmetrical current, the voltage and current output of the bridges remaining substantially constant while the phase is shifted through the asymmetrical current control, whereby the first motor is controlled in direction and speed while the second motor is controlled at least in speed.

9. An electrical circuit, comprising, in combination, means to vary the value of a direct current potential, a first and a second electric motor, an alternating current phase sensitive bridge circuit for each of the motors, the bridges each including a saturable core reactor having the impedance thereof simultaneously controlled by the direct current, the voltage and current output of the bridges remaining substantially constant while the phase is shifted through the direct current control, whereby the first motor is controlled in direction and speed while the second motor is controlled at least in speed.

10. In a circuit of the type described, in combination, means to vary the value of a direct current potential, a first alternating current motor rotatable in either direction, a second alternating current motor normally rotatable in one direction only, an alternating current phase sensitive bridge circuit for each of the motors, the bridges simultaneously controlled by the direct current, the voltage and current output of the bridges remaining substantially constant while the phase is shifted through the direct current control, and means biasing said second motor 90 degrees with the line phase whereby the first motor is controlled in direction and speed while the second motor is controlled in speed unidirectional both responsive to the direct current value.

11. An electrical circuit, comprising, in combination, thermionic tube means to vary the value of a direct current potential, a first two-phase induction motor, a second two-phase induction motor, an alternating current phase sensitive bridge circuit for each of the motors, the bridges each including a saturable core reactor having the impedance thereof simultaneously controlled by the variable direct current, each bridge including opposite reactance arms on said saturable reactor, the voltage and current output of the bridges remaining substantially constant while the phase is shifted through the direct current control, and means biasing said second motor substantially 90 degrees with the line phase whereby the first motor is controlled in direction and speed while the second motor is unidirectionally controlled in speed with both motors being responsive to the direct current value.

12. An electrical circuit, comprising, in combination, thermionic tube means to vary the value of a direct current potential, a first two-phase induction motor rotatable in either direction, a second two-phase induction motor normally rotatable in one direction only, an alternating current phase sensitive bridge circuit for each of the motors, the bridges each including a saturable core reactor having the impedance thereof simultaneously controlled by the variable direct current, each bridge including opposite reactance arms on said saturable reactor, the voltage and current output of the bridges remaining substantially constant while the phase is shifted through the direct current control, means for establishing the balance of each bridge so that the output voltage thereof is shifted substantially 90 degrees relative to the alternating current energization of the bridges, and means biasing one of the primaries of said second motor substantially 90 degrees with the line phase whereby the first motor is controlled in direction and speed while the second motor is unidirectionally controlled in speed with both motors being responsive to the direct current value.

13. A control system for a direct current electric motor including first and second electron discharge devices having cathode, control and anode elements, means for connecting the first anode and the second cathode to one terminal of an alternating current source, means for connecting said direct current electric motor between the other terminal of said source and the interconnected first cathode and second anode, first and second phase shifting bridges each having pairs of input and output terminals, means for energizing the input terminals from an alternating current source, means for connecting the output terminals of said first and second bridges to the cathode and control elements of said first and second electron discharge devices, respectively, each said bridge including opposite resistance arms and opposite reactance arms, said reactance arms of each bridge being included in a single saturable core reactor structure, said two cores each having direct current bias winding means and direct current control winding means, means for connecting said control winding means to a source of direct current control voltage, means for connecting said direct current bias winding means to a source of direct current, said bias and control windings of one reactor establishing additive fluxes and the windings of the other reactor establishing opposing fluxes.

14. A control system for a direct current electric motor including first and second electron discharge devices having cathode, control and anode elements, means for connecting the first cathode to the second anode, means for connecting the first anode and the second cathode to one terminal of an alternating current source, means for connecting said direct current electric motor between the other terminal of said source and the interconnected first cathode and second anode, first and second phase shifting bridges each having pairs of input and output terminals, means for energizing the input terminals from an alternating current source, means for connecting the output terminals of said first and second bridges to the cathode and control elements of said first and second electron discharge devices, respectively, each said bridge including opposite resistance arms and opposite reactance arms, said reactance arms of each bridge being included in a single saturable core reactor structure, said two cores each having a direct current bias winding and a direct current control winding, means for connecting said two control windings in series and to a source of direct current control voltage, and means for connecting said direct current bias windings in series and to a source of direct current, said bias and control windings of one reactor establishing additive fluxes and the windings of the other reactor establishing opposing fluxes.

15. A control system for a direct current electric motor including first and second electron discharge devices having control elements, means for connecting said motor to an alternating current source and to said devices in opposition, first and second phase shifting bridges each having pairs of input and output terminals, means for energizing the input terminals from an alternating current source, means for connecting the output terminals of said first and second bridges to the control elements of said first and second electron discharge devices, respectively, each said bridge including opposite reactance arms, said reactance arms of each bridge being included in a single saturable core reactor structure, said two cores each having bias winding means and control winding means with said winding means of one reactor establishing additive fluxes and the winding means of the other reactor establishing opposing fluxes, whereby the changes of current through said control winding means varies the fluxes of the two reactors on either side of a neutral point established by said bias winding means.

ANTHONY J. HORNFECK.

REFERENCES CITED

The following references are of record in the file of this patent:

UNITED STATES PATENTS

| Number | Name | Date |
|---|---|---|
| 1,920,803 | Nagashev | Aug. 1, 1933 |
| 2,175,009 | Anderson | Oct. 3, 1939 |
| 2,228,295 | Moyer et al. | June 30, 1942 |